United States Patent [19]
Tremain et al.

[11] Patent Number: 4,594,080
[45] Date of Patent: Jun. 10, 1986

[54] MOLECULAR SIEVE TYPE GAS SEPARATION SYSTEMS

[75] Inventors: J. Keith Tremain; James C. Taylor, both of Yeovil, England

[73] Assignee: Normalair-Garrett Holdings Ltd., Yeovil, England

[21] Appl. No.: 702,738

[22] Filed: Feb. 19, 1985

[30] Foreign Application Priority Data

Feb. 20, 1984 [GB] United Kingdom ............... 8408887

[51] Int. Cl.$^4$ ............................................. B01D 53/04
[52] U.S. Cl. ...................................... 55/179; 55/210; 55/389
[58] Field of Search .................. 55/18, 21, 25, 26, 68, 55/75, 163, 179, 210, 389

[56] References Cited

U.S. PATENT DOCUMENTS

| 3,192,686 | 7/1965 | Berkey et al. | 55/21 |
| 3,922,149 | 11/1975 | Ruder et al. | 55/21 |
| 4,197,096 | 4/1980 | Sebastian et al. | 55/163 |
| 4,198,213 | 4/1980 | Mannatt | 55/68 X |
| 4,222,750 | 9/1980 | Gauthier et al. | 55/68 X |
| 4,323,370 | 4/1982 | Leitgeb | 55/18 |
| 4,404,005 | 9/1983 | Hamlin et al. | 55/179 X |
| 4,428,372 | 1/1984 | Beysel et al. | 55/21 X |
| 4,455,861 | 6/1984 | Alftine | 55/21 X |
| 4,516,424 | 5/1985 | Rowland | 55/21 X |
| 4,537,607 | 8/1985 | Rogers et al. | 55/179 X |

FOREIGN PATENT DOCUMENTS

| 36285 | 9/1981 | European Pat. Off. | |
| 2066693 | 7/1981 | United Kingdom | 55/163 |

Primary Examiner—Robert Spitzer
Attorney, Agent, or Firm—Larson and Taylor

[57] ABSTRACT

The concentration of a constituent gas in a product gas delivered by a molecular sieve type gas separation system 10 is controlled by a flueric partial pressure sensor 15 connected to a spill-valve 16 which is conduitly connected to a product gas delivery duct 13. The flueric partial pressure sensor 15 compares a reference bleed of supply gas with a sample bleed of product gas and outputs signals to control the spill-valve in spilling product gas from the delivery duct 13 so that the rate of flow of gas through adsorption beds 11 of the system 10 is controlled to provide product gas having a required concentration of the constituent gas.

10 Claims, 6 Drawing Figures

MOLECULAR SIEVE TYPE GAS SEPARATION SYSTEMS

DESCRIPTION OF INVENTION

This invention relates to molecular sieve type gas separation systems and more particularly to apparatus for improving control of the concentration value of a constituent gas in a product gas delivered thereby.

Molecular sieve type gas separation systems are being introduced into breathable gas supply systems, such as for life support of medical patients and aviation aircrew members, where they provide oxygen concentrators for the enrichment of air delivered to a user. In such separation systems ambient air is supplied from a pressurising source into two or more adsorber beds where nitrogen is removed by use of a process generally known as a pressure swing adsorption process. Such systems are often identified as molecular sieve oxygen generator systems, MSOGS or, with respect to aircraft systems, frequently, as on-board oxygen generator systems, OBOGS.

One form of contemporary MSOGS comprises a concentrator having two adsorber beds adapted for alternately and sequentially adsorbing/desorbing nitrogen and arranged to deliver oxygen-enriched air as product gas to a delivery regulator by way of a volumetric capacity which provides a buffer between the delivery characteristics of the MSOGS and the breathing requirements of the user.

The concentration value of the enriched gas delivered to the user may require to be sensed to maintain a predetermined level such as in a medical application or to vary the level appropriate to a changing environmental condition such as during variations in cabin pressure (altitude) of an aircraft in an aviation application.

In a prior art form of OBOGS, shown schematically in FIG. 1, where the level of concentration, or partial pressure of oxygen, $PPO_2$, of the product gas delivered to an aircrew member is required to be appropriate to the cabin pressure (altitude), it is the practice to achieve this requirement by utilising, in combination with a cabin pressure sensor A, a polarographic oxygen sensor means B and an operably associated spill-valve C positioned in the delivery line D from the concentrator E at or intermediate a volumetric capacity F and a delivery regulator G to which the aircrew member conduitly connects his mask.

Such an arrangement provides control of the $PPO_2$ of the oxygen-enriched air delivered to the mask by enabling regulation of the rate of flow through the adsorber beds of the concentrator, in which a greater or lesser flow reduces or increases, respectively, the amount of nitrogen adsorbed from a unit volume of the supplied air. When the polarographic sensor senses a $PPO_2$ value above its set point value a signal is passed to open the associated spill-valve which spills enriched air from the delivery conduit system so that a greater flow rate of supply air then passes through the beds of the concentrator and less adsorption of nitrogen occurs, so that the $PPO_2$ value of the product gas decreases. When the desired lower $PPO_2$ value is sensed by the polarographic sensor then the signal is cancelled and the spill-valve closed so that the flow rate of supplied air passing through the beds of the concentrator reduces into accord with the demand flow made of the delivery regulator.

However such control of the prior art type OBOGS does not provide an ideal response to changing cabin pressure, because of long time constants arising from the slow reaction of polarographic sensors and the volume of product gas in the delivery conduit system between the beds of the concentrator and the sensor, which result in a considerable destabilising influence in the control of the $PPO_2$ value of the delivered product gas, so that this value is often less appropriate to pertaining cabin pressure than desired. In order not to add to the considerable time delay, a fast-acting solenoid type bleed valve is usually utilised; however, this results in high pressure swings in the product gas with each operation of the solenoid.

It might be possible to compensate electronically for the destabilising influence of the system time constants by suitable modification of the operating circuitry of the polarographic oxygen sensor means and its operably associated spill-valve. However, it is considered that a sufficiently inexpensive and compact electronic unit cannot be achieved if the long time constants, delays and tuning of all the variations in the performance of the concentrator and the polarographic sensor are all to be accommodated.

Accordingly, the present invention provides apparatus for controlling the concentration of a constituent gas in a product gas delivered by a molecular sieve type gas separation system including a concentrator having two or more adsorption beds arranged for receiving pressurised supply gas and delivering the product gas towards an outlet, the apparatus comprising a flueric partial pressure sensor, arranged to compare a reference bleed of the supply gas with a sample bleed of the product gas, having signal outlets connected to control means of an operably associated spill-valve, the spill-valve being arranged for conduit connection to a product gas delivery duct so that the rate of flow of gas through the adsorption beds may be controlled by spilling product gas from the delivery duct thereby controlling the concentration of the constituent gas in the product gas.

The spill-valve control means preferably includes a servo-valve which whilst it may be controlled by a solenoid is, preferably, controlled by a pneumatic actuator.

When, however, the servo-valve is controlled by a solenoid, translation of the output signal of the flueric partial pressure sensor from a pneumatic to an electrical form may be obtained by inclusion of a pressure/electrical transducer, such as a proximity switch.

The flueric partial pressure sensor is, preferably, one which automatically maintains a constant set-point value in changing ambient pressure as disclosed in EP-A-O 036 285, so that a separate altitude sensor and signal integrator means is not required.

The spill-valve control means may further comprise valve means responsive to ambient atmospheric pressure or a pressure related thereto and arranged to negate operation of the servo-valve.

This pressure responsive valve means may include an aneroid which is, preferably, arranged so that in varying its length it allows movement of a magnetic valve member between opening and closing a vent path controllable by the servo-valve.

The spill-valve control means may also include valve means responsive to the pressure of product gas being delivered by way of the spill-valve and arranged to negate operation of the servo-valve.

The valve means responsive to the product gas pressure is preferably a piston-operated valve-head arranged for movement between opening and closing the vent path controllable by the servo-valve. Preferably the piston and the valve-head comprise an integral element.

The invention will now be described, by way of example, with reference to the accompanying drawings in which:

FIG. 1 schematically represents a prior art molecular sieve type gas separation system as discussed above;

FIG. 2 schematically represents a molecular sieve type gas separation system including apparatus in accordance with one embodiment of the present invention;

Figure 1:
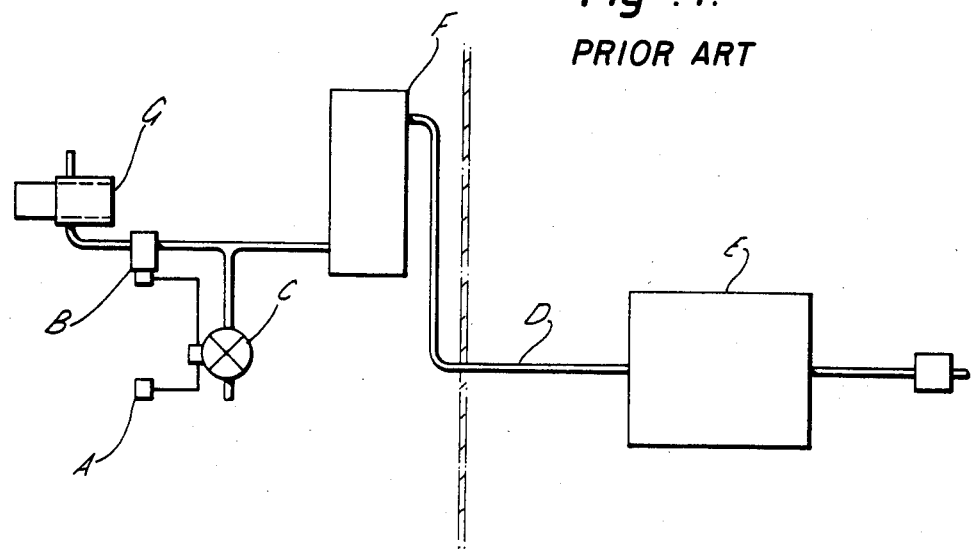
Figure 2:
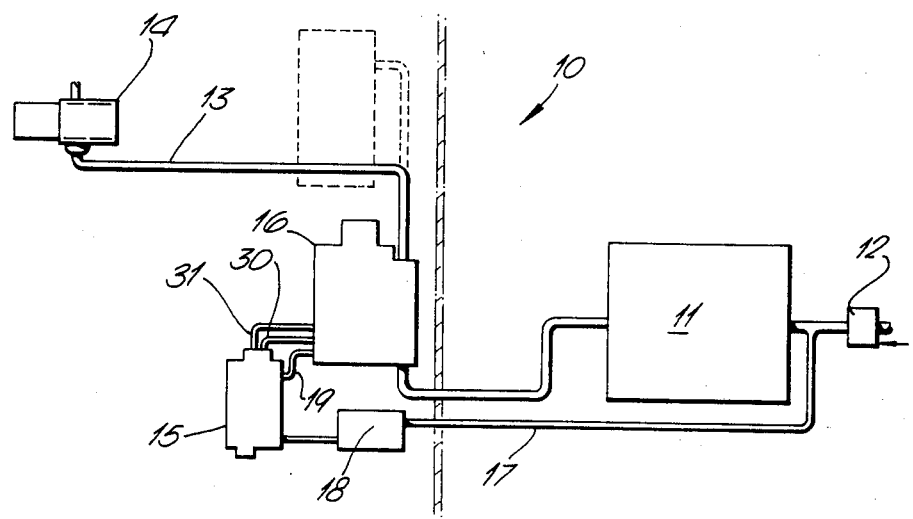

In the embodiment of the invention illustrated in FIG. 2, a molecular sieve oxygen-enriched air generator system 10 (MSOGS or OBOGS) for aircraft use includes a concentrator 11 having two or more nitrogen adsorption beds (not shown) arranged to receive pressurised air supplied from an engine of the aircraft (not shown) by way of a pressure regulating valve 12. A product gas delivery duct 13 connects the concentrator 11 with an outlet comprised by a gas delivery regulator 14 to which an aircrew member couples his breathing mask (not shown). Apparatus for controlling the concentration of oxygen in the delivered product gas comprises a flueric partial pressure sensor 15 arranged to provide operation of a spill-valve 16, conduitly interconnected with the delivery duct 13 intermediate the concentrator 11 and the gas delivery regulator 14.

The flueric partial pressure sensor 15 is connected so as to receive supply air from downstream of the pressure regulating valve 12 by way of a conduit 17 which includes a pressure reducer 18 of any suitable known form and, further, to receive product gas through ducting 19 which connects with a transfer duct in spill-valve 16.

Figure 3:
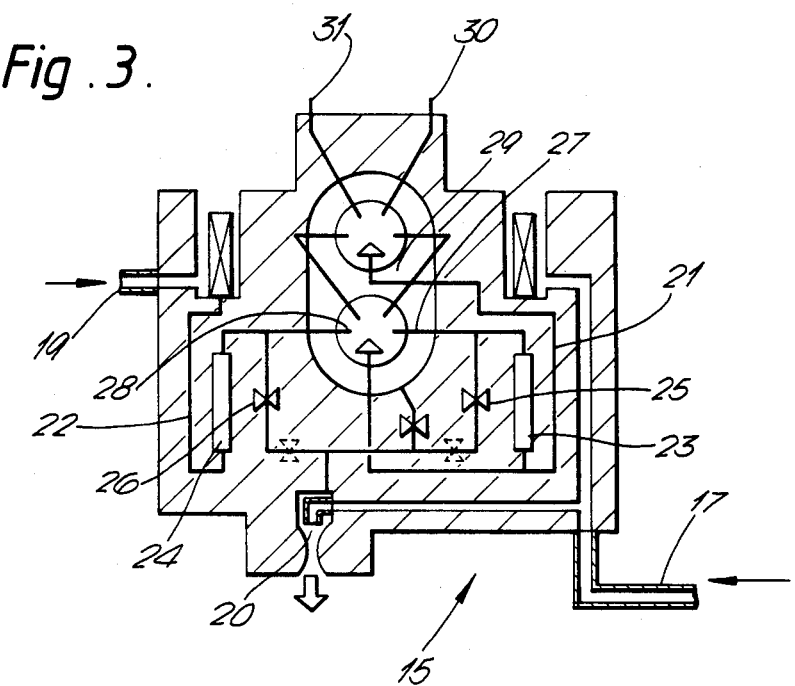
FIG. 3 is a schematic representation of a flueric partial pressure sensor suitable for use in the apparatus of the system illustrated in FIG. 2.

As shown in FIG. 3, the supply air conduit 17 connects with an aspirator 20 of the flueric partial pressure sensor 15 and also with one leg 21 of a bridge therein for passing air as a reference gas therethrough. The second leg 22 of the bridge is connected with the ducting 19 for receiving product gas as a sample gas. The two bridge legs 21, 22 each, respectively, include a linear resistor 23, 24 and an orifice resistor 25, 26 arranged in series.

A bridge signal is generated from between each pair of linear and orifice restrictors 23, 25; 24, 26 and connected to two control ports 27, 28 of the first stage of a two-stage flueric amplifier 29 which forms an integral part of the partial pressure sensor 15. Operating signals from the second stage of the amplifier 29 are conveyed to the spill-valve 16 by way of two ducts 30, 31. A flueric partial pressure sensor of this form is disclosed in EP-A-0 036 285.

Figure 4:
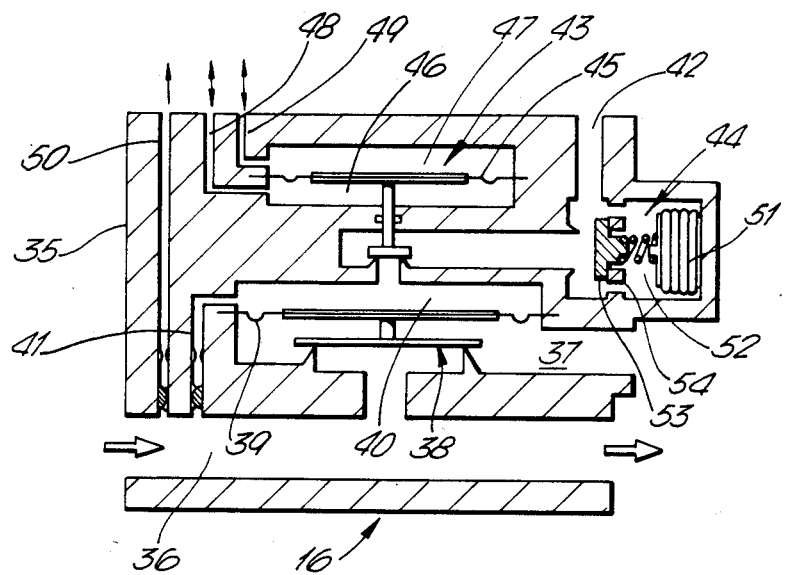
FIG. 4 is a schematic representation of a spill-valve suitable for use in the apparatus of the system illustrated in FIG. 2.

A preferred form of spill-valve 16, shown in FIG. 4, comprises a body 35 having a main duct 36 for the passage of product gas passing from the concentrator 11 to the gas delivery regulator 14. A spill flow duct 37 connects the main duct 36 with a region external to the body 35, preferably the interior of the aircraft cabin, by way of a diaphragm-operated outlet valve 38. The diaphragm 39 of the outlet valve 38 forms one wall of a control pressure chamber 40 which is connected to the main duct 36 by way of a restricted duct 41. The control pressure chamber 40 is arranged for venting into the region external to the body 35 by way of a duct 42 controlled by a diaphragm-operated servo-valve 43 and an aneroid-operated valve 44 positioned downstream of valve 43.

The diaphragm 45 of the servo-valve 43 divides the servo pressure chamber into two sub-chambers 46, 47 which are connected to the outside of the body 35 by ducts 48, 49 respectively for connection to the amplifier ducts 30, 31 of the flueric partial pressure sensor 15. The transfer duct for conveying sample product gas to the flueric partial pressure sensor 15 is provided by a restricted duct 50 connecting the main duct 36 to the outside of the body 35. The aneroid-operated valve 44 comprises an aneroid capsule 51 arranged within a chamber 52 of the vent duct 42 and exposed to pressure external of the body 35, e.g. ambient atmospheric pressure or a pressure related thereto, in a manner such that in expanding it loads a compression spring to overcome the magnetic attraction between a valve member 53 and magnetic structure 54 forming a part of the capsule chamber 52.

Figure 5:
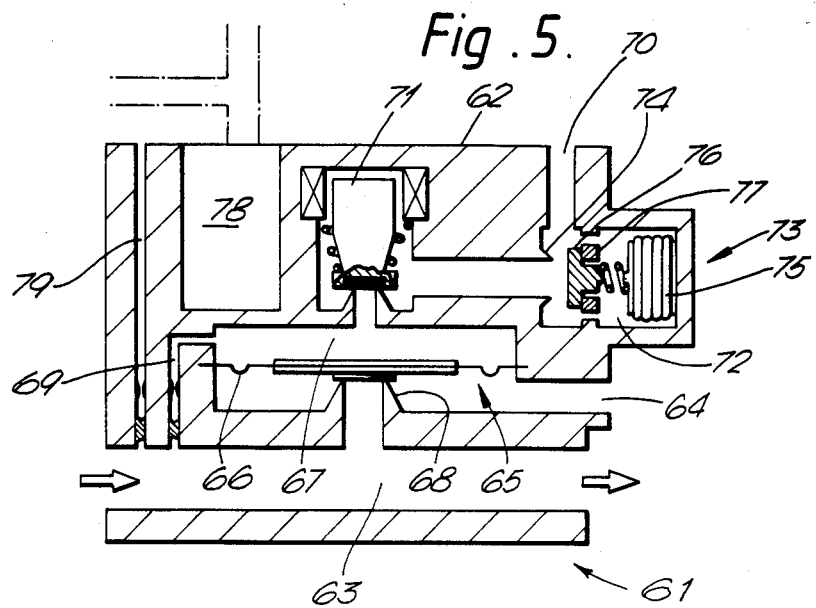
FIG. 5 is a schematic representation of an alternative spill-valve suitable for use in the apparatus of the system illustrated in FIG. 2.

An alternative form of spill-valve 61, as shown in FIG. 5, comprises a body 62 having a main duct 63 and a spill flow duct 64 which connects a region external of the body with the main duct 63 by way of an outlet valve 65 of diaphragm type. The diaphragm 66 of this valve 65 forms one wall of a control chamber 67 and also, on its side remote therefrom, is engageable with a valve seat 68 in the spill flow duct 64. The control chamber 67 is connected with the main duct 63 by way of a restricted passage 69 and also with the exterior of the body 62 by way of a vent duct 70 that is obturated by a solenoid valve 71. The vent duct 70 includes a valve chamber 72 housing an aneroid-operated valve 73 arranged to close upon a valve seat 74 in the duct 70. The aneroid 75 of the valve 73 is exposed to ambient atmospheric pressure or a pressure related thereto so that in expanding it loads a compression spring to overcome the magnetic attraction between a valve member 76 and magnetic structure 77 forming part of the valve chamber 72. A relay 78 is incorporated into the valve body 62 for control of the solenoid valve 71 and is arranged to receive electrical power from a power tapping which is interruptable by interconnection with a diaphragm-type proximity switch (not shown) operable by connection to the amplifier output ducts 30, 31 of the flueric partial pressure sensor 15. A transfer duct for conveying sample gas to the flueric partial pressure sensor 15 is provided by a restricted duct 79 connecting the main duct 63 with the outside of the body 62.

In operation of this embodiment, pressurised air from a compressor stage of an aircraft gas turbine engine is supplied to the system via pressure regulating valve 12 from whence it is delivered at a steady pressure of, say, 172.35 kPa (25 psi) to the concentrator 11 and by conduit 17 to the pressure reducer 18 in which it is reduced to 31.02 kPa (4.5 psi) relative to cabin pressure. This lower pressure is fed to the flueric partial pressure sensor 15 to provide a reference sample gas (air) and also a power supply to the two stages of the amplifier 29 and to the aspirator 20 for inducing flow through the reference and sample ducts of the sensor. Air is thus made available to the reference bridge leg 21 while product gas taken from the delivery duct 13 by way of the transfer duct 50 in the spill-valve 16 and ducting 19 is made available to the sample bridge leg 22, in which legs the respective gases pass through the serially arranged linear and orifice resistors 23, 25 and 24, 26. A small differential pressure (bridge output) obtains at the control ports 27, 28 of the amplifier 29 and applies a greater pressure either to duct 30 or duct 31 according to the concentration level of oxygen in the product gas relative to a predetermined datum oxygen partial pressure level, say 250 mm Hg. The ducts 30, 31 being connected to ducts 48, 49, respectively, and thus sub-chambers 46, 47 of the servo-valve 43 diaphragm control chamber, allow the output pressures from the amplifier 29 to obtain in these two sub-chambers. Connection of these ducts is so arranged that when the oxygen concentration datum level is exceeded the greater pressure appears in sub-chamber 46 whereby the servo-valve 43 is urged to open and allow product gas to vent from the main duct 36 and spill flow duct 37 of the spill-valve 16; whereby flow of air through the concentrator is increased and the amount of nitrogen adsorbed per unit volume of air is reduced and thus the oxygen-enrichment process abated. As soon as the oxygen concentration level in the sample gas falls below the datum level the bridge output pressure difference reverses and the sub-chamber 47 obtains the greater pressure so that the servo-valve 43 is urged into closing and spillage of product gas from the main duct 36 prevented. The aneroid-operated magnetic valve 44 operates automatically at, say, approximately 6400 meters (21000 ft) by expanding to a point where it increases the spring load on the valve member 53 such that the magnetic attraction between this and the magnetic structure 54 is overcome and the member then snaps onto its associated valve seat under the influence of the spring. This action closes the vent duct 42 so that pressure in the control chamber 40 cannot be relieved (and the outlet valve opened to spill product gas) whereby, above the chosen altitude at which valve 44 operates, the concentration level of oxygen in product gas passed to the delivery regulator 14 remains at maximum value.

In operation of the alternative spill-valve 61, typically, a 28 volt D.C. electric current is made available to the relay 78 by way of the diaphragm-type proximity switch (not shown) which is connected to the amplifier outlet ducts 30, 31 of the flueric partial pressure sensor 15, in a manner for deflection of the diaphragm of the switch to control of operation of the solenoid valve 71. Product gas passes through the main duct 63 and also feeds to the flueric partial pressure sensor 15 via duct 79 and into control pressure chamber 67 through restricted duct 69. While the solenoid valve 71 remains seated, pressure in the control pressure chamber 67 urges the diaphragm 66 into seating and so prevents the spillage of product gas through the spill flow duct 64. When the flueric partial pressure sensor 15 responds to a higher than datum reference value, the signal output from the amplifier 29 causes deflection of the diaphragm of the proximity switch (not shown) so as to complete the electrical circuit through the relay 78 to energise the solenoid valve 71 into lifting and so enable release of pressure from the control pressure chamber 67 and thereby allow the diaphragm 66 to be unseated and the spill flow duct 64 to be opened, which consequently causes a greater flow of supply air to pass through the concentrator 11. This reduces enrichment of the air delivered as product gas until the level of oxygen concentration therein falls to the datum reference level, at which the sensor 15 alters its output signal to cause opposite deflection of the diaphragm of the proximity switch with opposite result. The aneroid-operated valve 73 functions in like manner to that of the aneroid-operated valve 44 described above in respect of the preferred spill-valve 16 when its closure above 6400 meters (21000 feet) serves to block the vent duct 70 so that pressure in control chamber 67 cannot be relieved (and the outlet valve opened to spill product gas from the main duct 63) thereby maintaining the delivered product gas at a maximum enrichment level.

In use of some forms of concentrator on aircraft having a particular flight envelope such that the supply pressure to the system can become abnormally low, a combination of conditions is able to occur which results in low product gas pressure at the regulator delivering to the aviator's mask and high pressure swings within the mask during breathing cycles. This result can be aggravated further should the spill-valve spill product gas when such conditions occur. As so far described, the spill-valves of the illustrated embodiment do not allow spilling of product gas at pressures below the predetermined operating pressure of the aneroid valve 44 or 73, i.e. above a given cabin altitude; however, in order to prevent spillage when supply pressure becomes low at cabin altitudes below that at which the aneroid valve closes, it is desirable to include a further valve which operates at a predetermined low product gas delivery pressure.

Figure 6:
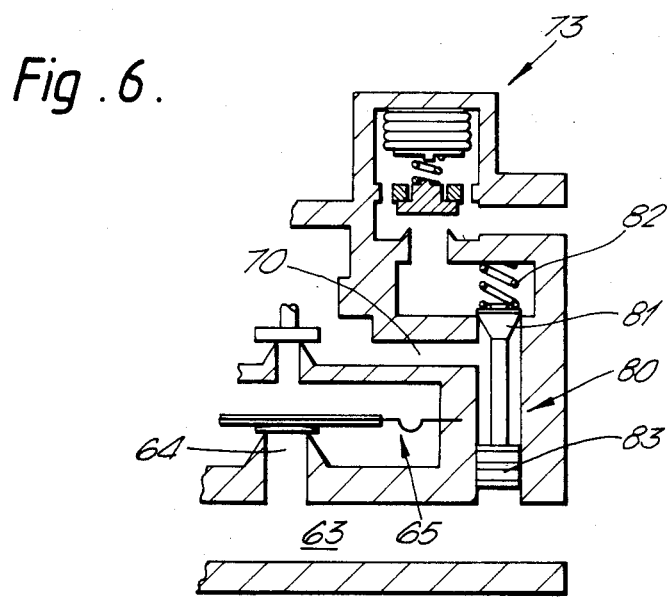
FIG. 6 illustrates an additional valve arrangement applicable to the spill-valve of FIGS. 4 or 5.

One such valve comprises a valve assembly 80, as shown in FIG. 6, arranged to obturate the control pressure vent duct 70. The valve assembly 80 includes a valve-head 81 that is urged by a compression spring 82 towards closing onto a valve seat formed in the duct 70 and is integral with a piston 83, but distanced therefrom by a stem. The piston 83 is responsive to product gas pressure in the main duct 63 of the spill-valve, so that this pressure and the spring load on the valve-head 81 are in opposition. Pressure external to the spill-valve (cabin pressure) is also effective on the valve-head 81 when the aneroid valve 73 is not closing the vent duct 70.

In operation of the valve assembly 80, assuming that the pressure of the product gas in the main duct 63 is above a predetermined minimum value of, say, 34.5 kPa (5 psi) and the aneroid valve 73 is in the open condition, then the product gas pressure on the piston 83 and the spring load combined with the cabin gas pressure on the valve-head 81 balance and hold the valve-head in the open position. This allows control pressure to vent from the spill-valve via duct 70 when the solenoid valve is energised into the open position and so enable the outlet valve 65 to open for product gas to be spilled from the main duct 63. When, however, the product gas pressure in the main duct 63 falls below the predetermined minimum value the spring 82 then becomes dominant and moves the valve-head 81 into closing the vent duct 70 which disenables the outlet valve 65 to open and thus keeps the pressure of the product gas at the maximum value available.

Whilst the alternative spill-valve 63 utilising a solenoid valve 71 in its operation provides a very satisfactory control arrangement in regulation of the level of oxygen-enrichment of air delivered from a molecular sieve oxygen generator or concentrator 11, the preferred spill-valve 16 which is totally of pneumatic operation provides lower amplitudes of pressure fluctuations in the delivery of product gas to the regulator 14 during its operation.

What is claimed is:

1. Apparatus for controlling the concentration of a constituent gas in a product gas delivered by a molecular sieve type gas separation system including a concentrator having two or more adsorption beds arranged for receiving pressurised supply gas and delivering product gas by way of a delivery duct to an outlet, the apparatus comprising a flueric partial pressure sensor, arranged to compare a reference bleed of the supply gas with a sample bleed of the product gas, having signal outlets connected to control means of an operably associated spill-valve, the spill-valve being arranged for conduit connection to the delivery duct so that the rate of flow of gas through the adsorption beds may be controlled by spilling product gas from the delivery duct, thereby controlling the concentration of the constituent gas in the product gas.

2. Apparatus as claimed in claim 1, wherein the spill-valve control means comprises a servo-valve.

3. Apparatus as claimed in claim 2, wherein the servo-valve is controlled by a pneumatic actuator.

4. Apparatus as claimed in claim 2, wherein the servo-valve is controlled by a solenoid.

5. Apparatus as claimed in claim 2, wherein the spill-valve control means further comprises valve means responsive to ambient atmospheric pressure or a pressure related thereto and arranged to negate operation of the servo-valve.

6. Apparatus as claimed in claim 5, wherein the valve means includes an aneroid.

7. Apparatus as claimed in claim 6, wherein the aneroid is arranged so that in varying its length it allows movement of a magnetic valve member between opening or closing a vent path controllable by the servo-valve.

8. Apparatus as claimed in claim 2, wherein the spill-valve control means includes valve means responsive to the pressure of product gas being delivered by way of the spill-valve and arranged to negate operation of the servo-valve.

9. Apparatus as claimed in claim 8, wherein the product gas pressure responsive valve means comprises a piston operated valve-head arranged for movement between opening or closing a vent path controllable by the servo-valve.

10. A molecular sieve type gas separation system for supplying oxygen-enriched product air comprising:
a concentrator having two or more molecular sieve adsorption beds arranged for receiving pressurised supply air and delivering oxygen-enriched product air by retention in the sieve beds of at least a percentage of the nitrogen in the supply air;
a delivery duct connecting between the concentrator and an outlet for delivery of oxygen-enriched product air from the concentrator to the outlet;
a spill-valve having spill-valve control means and being conduitly connected with said delivery duct for spilling oxygen-enriched product air from said delivery duct;
a flueric partial pressure sensor having means for comparing a reference bleed of supply air with a sample bleed of oxygen-enriched product air and outputting signals from signal outlets of said flueric partial pressure sensor; and
means connecting the signal outlets of said flueric partial pressure sensor with said spill-valve control means whereby signals output by said flueric partial pressure sensor cause said spill-valve to spill oxygen-enriched product gas from said delivery duct so that the rate of flow of air through said molecular sieve adsorption beds is varied thereby controlling the concentration of oxygen in the oxygen-enriched product air.

* * * * *